US009911552B2

(12) United States Patent
Morita (10) Patent No.: US 9,911,552 B2
(45) Date of Patent: Mar. 6, 2018

(54) OPERATING DEVICE

(71) Applicant: Sony Computer Entertainment Inc., Tokyo (JP)

(72) Inventor: Masaho Morita, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 657 days.

(21) Appl. No.: 14/048,715

(22) Filed: Oct. 8, 2013

(65) Prior Publication Data

US 2014/0102869 A1 Apr. 17, 2014

(30) Foreign Application Priority Data

Oct. 15, 2012 (JP) ................................ 2012-228482

(51) Int. Cl.
| | | |
|---|---|---|
| A63F 13/06 | (2006.01) | |
| H01H 13/14 | (2006.01) | |
| A63F 13/20 | (2014.01) | |
| G06F 3/0338 | (2013.01) | |
| G06F 3/0354 | (2013.01) | |

(52) U.S. Cl.
CPC ............. H01H 13/14 (2013.01); A63F 13/06 (2013.01); G06F 3/0338 (2013.01); G06F 3/03547 (2013.01); A63F 2300/1043 (2013.01); A63F 2300/1068 (2013.01); G06F 2203/0381 (2013.01)

(58) Field of Classification Search
CPC ...................................... A63F 13/06
USPC ............... 463/36–38; 345/156–184
See application file for complete search history.

(56) References Cited

U.S. PATENT DOCUMENTS

| | | | |
|---|---|---|---|
| 5,278,362 A * | 1/1994 | Ohashi .......................... 200/5 A |
| 6,394,906 B1 | 5/2002 | Ogata | |
| 7,060,922 B2 * | 6/2006 | Hoehne et al. ............... 200/314 |
| 8,772,660 B2 | 7/2014 | Liang | |
| 8,870,654 B2 * | 10/2014 | Nakayama et al. ............ 463/38 |
| 2005/0052425 A1 * | 3/2005 | Zadesky ............... G06F 3/0338 345/173 |

(Continued)

FOREIGN PATENT DOCUMENTS

| | | |
|---|---|---|
| CN | 202018890 U | 10/2011 |
| JP | 1989150328 U | 10/1989 |

(Continued)

OTHER PUBLICATIONS

Office Action for corresponding JP Application No. 2012-228482, 9 pages, dated Jun. 7, 2016.

(Continued)

*Primary Examiner* — David L Lewis
*Assistant Examiner* — Shauna-Kay Hall
(74) *Attorney, Agent, or Firm* — Matthew B. Dernier, Esq.

(57) ABSTRACT

Disclosed herein is an operating device including: a circuit board; a frame arranged on top of the circuit board; a plate-shaped operating member located on top of the frame, the plate-shaped operating member including a surface touched by a user's finger and a touch sensor adapted to detect the position of the user's finger that has touched the surface, the plate-shaped operating member being arranged to be able to move up and down so that the operating member can be pressed by the user; and an elastic member arranged between the frame and operating member to bias the operating member upward.

9 Claims, 10 Drawing Sheets

(56) References Cited

U.S. PATENT DOCUMENTS

| | | | |
|---|---|---|---|
| 2006/0111180 A1* | 5/2006 | Cheng | A63F 13/06 463/36 |
| 2007/0200830 A1* | 8/2007 | Yamamoto | 345/173 |
| 2007/0216662 A1* | 9/2007 | Tanaka | G06F 1/1616 345/173 |
| 2007/0222766 A1* | 9/2007 | Bolender | G06F 3/044 345/173 |
| 2007/0243933 A1* | 10/2007 | Cheng | A63F 13/06 463/37 |
| 2008/0204401 A1* | 8/2008 | Lin et al. | 345/156 |
| 2009/0033514 A1 | 2/2009 | Yamagiwa | |
| 2009/0282942 A1* | 11/2009 | Wilson | 74/473.3 |
| 2011/0242029 A1* | 10/2011 | Kasahara | G06F 3/016 345/173 |
| 2011/0242042 A1* | 10/2011 | Xu | G06F 3/0416 345/174 |
| 2012/0194417 A1* | 8/2012 | Liang | H01H 3/122 345/156 |
| 2014/0094309 A1* | 4/2014 | Osawa | A63F 13/06 463/37 |

FOREIGN PATENT DOCUMENTS

| | | |
|---|---|---|
| JP | 2000200141 A | 7/2000 |
| JP | 2000284911 A | 10/2000 |
| WO | 2012078196 A1 | 6/2012 |

OTHER PUBLICATIONS

Office Action for corresponding CN Application No. 201310463659.6, 8 pages, dated Feb. 29, 2016.

\* cited by examiner

OPERATING DEVICE

BACKGROUND

The present disclosure relates to an operating device used as an input device for an information processor such as a gaming machine.

The operating device disclosed in U.S. Pat. No. 6,394,906 has operating members such as buttons and operating sticks. The operating device includes a circuit board equipped with circuitry and components adapted to transmit signals responsive to the operations of the operating members to an information processor.

SUMMARY

Among operations that can be performed on a operating device in related art by the user are pressing the buttons, tilting the operating stick, and rotating the operating stick while keeping it tilted. Diversification of user operation provides improved operability of the operating device.

It is desirable to provide an operating device that can diversify user operations while at the same time keeping to a minimum the reduction in the degree of freedom in laying out components and wiring on a circuit board.

An operating device according to an embodiment of the present disclosure includes a circuit board, frame and plate-shaped operating member. The frame is arranged on top of the circuit board. The operating member is located on top of the frame. The operating member includes a surface touched by a user's finger and a touch sensor adapted to detect the position of the user's finger that has touched the surface. The operating member is arranged to be able to move up and down so that it can be pressed by the user. Further, the operating device includes an elastic member which is arranged between the frame and operating member to bias the operating member upward.

The embodiment of the present disclosure allows the user to slide his or her finger on the operating member and press the operating member while at the same time sliding his or her finger thereon, thus diversifying operation methods. Further, there is no need to provide any area for attaching an elastic member on the circuit board, thus keeping to a minimum the reduction in the degree of freedom in laying out components and wiring on the circuit board.

DETAILED DESCRIPTION OF THE PREFERRED EMBODIMENT

Figure 1:
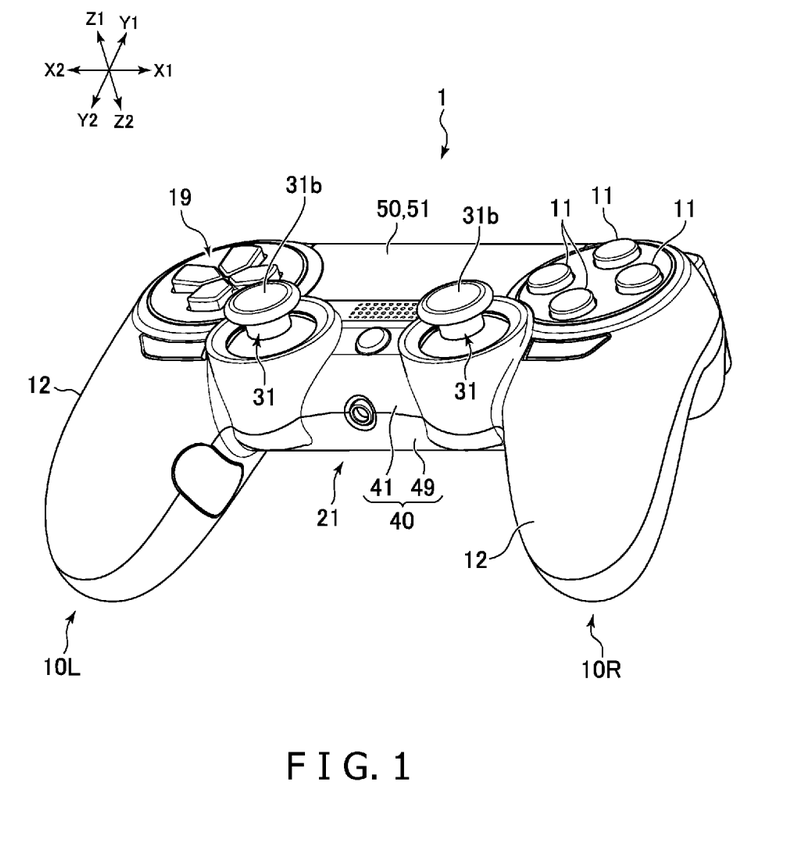
FIG. 1 is a perspective view of an operating device according to an embodiment of the present disclosure.
Figure 2:
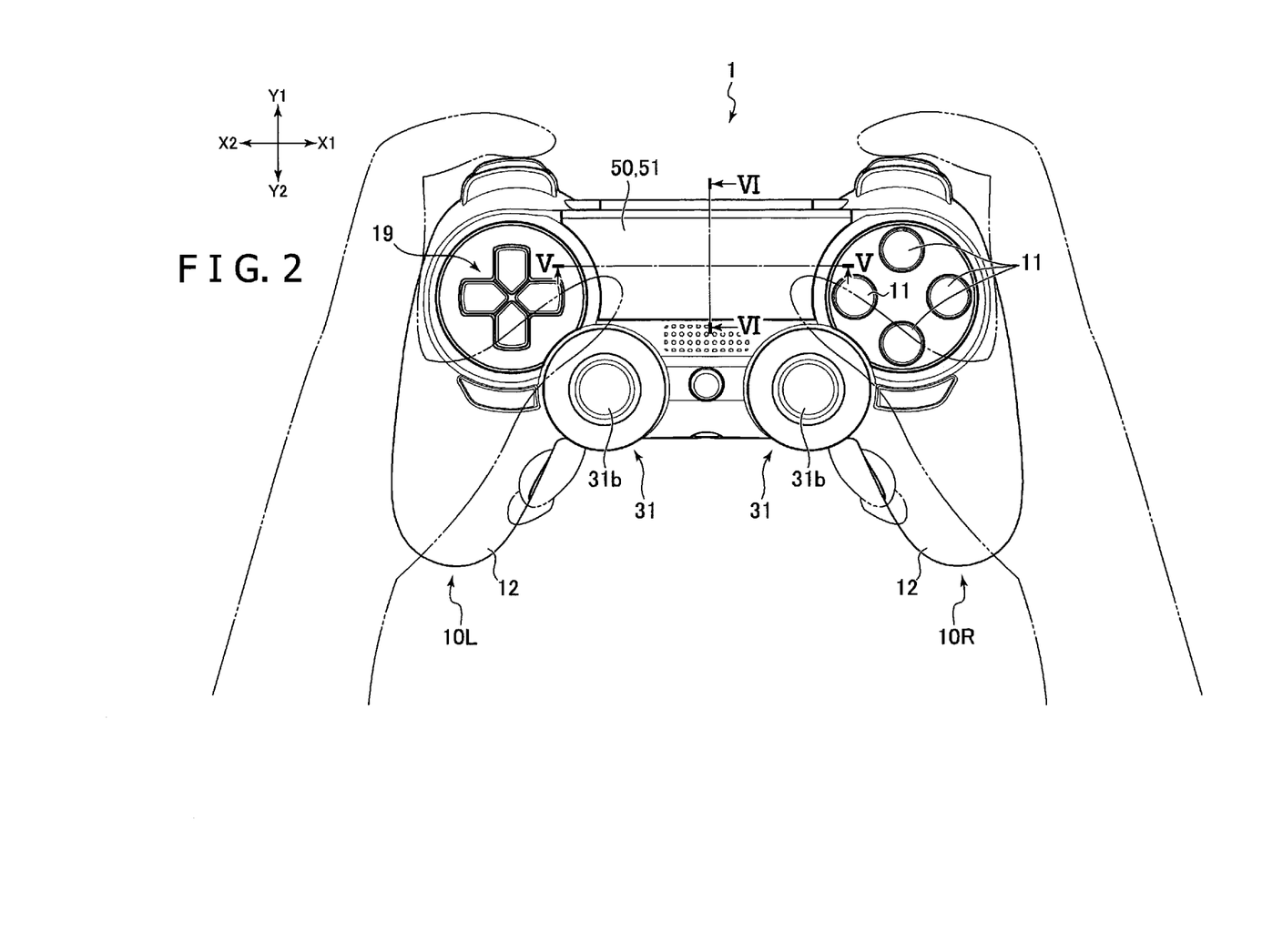
FIG. 2 is a plan view of the operating device.
Figure 3:
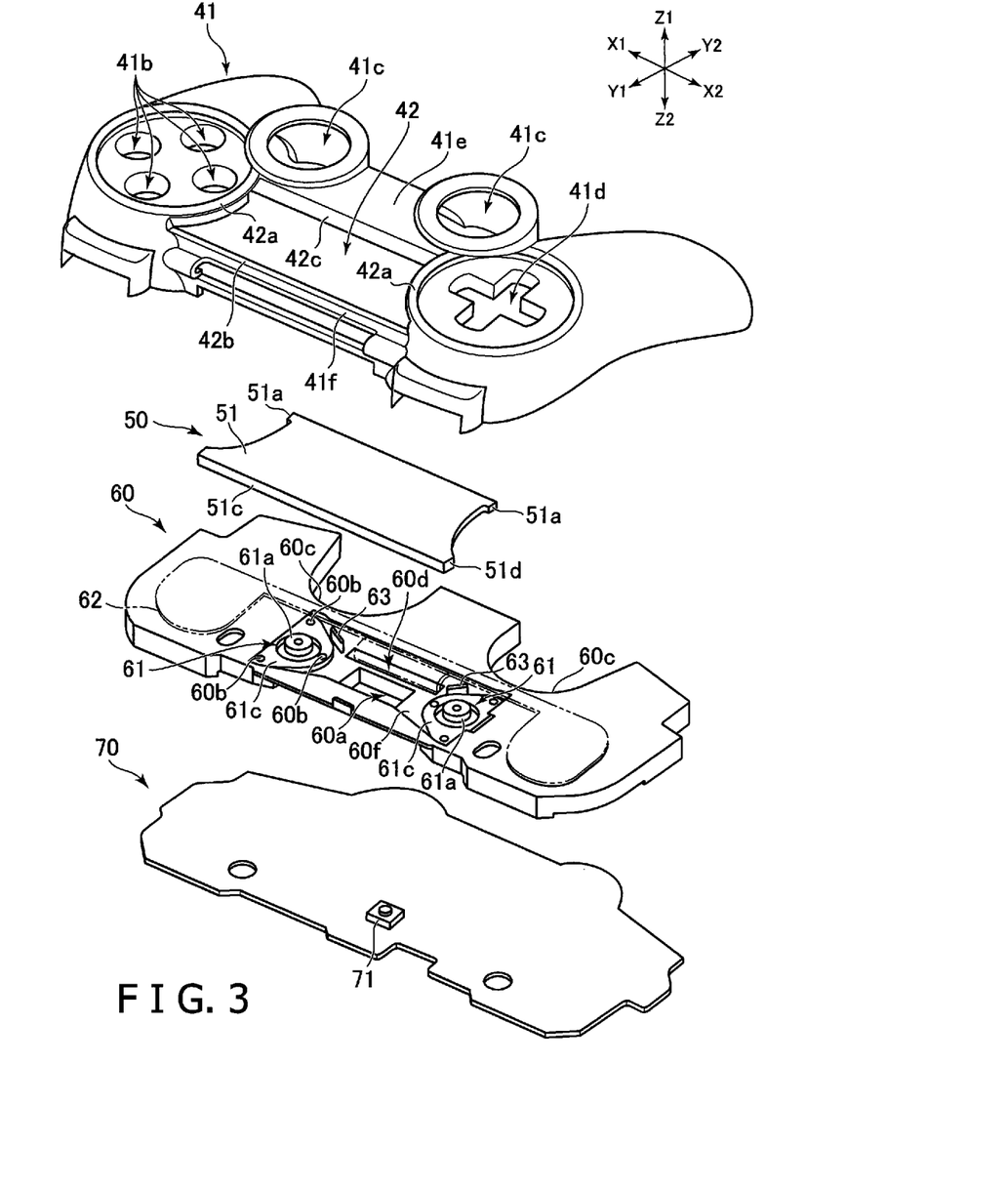
FIG. 3 is an exploded perspective view of the operating device.
Figure 4:
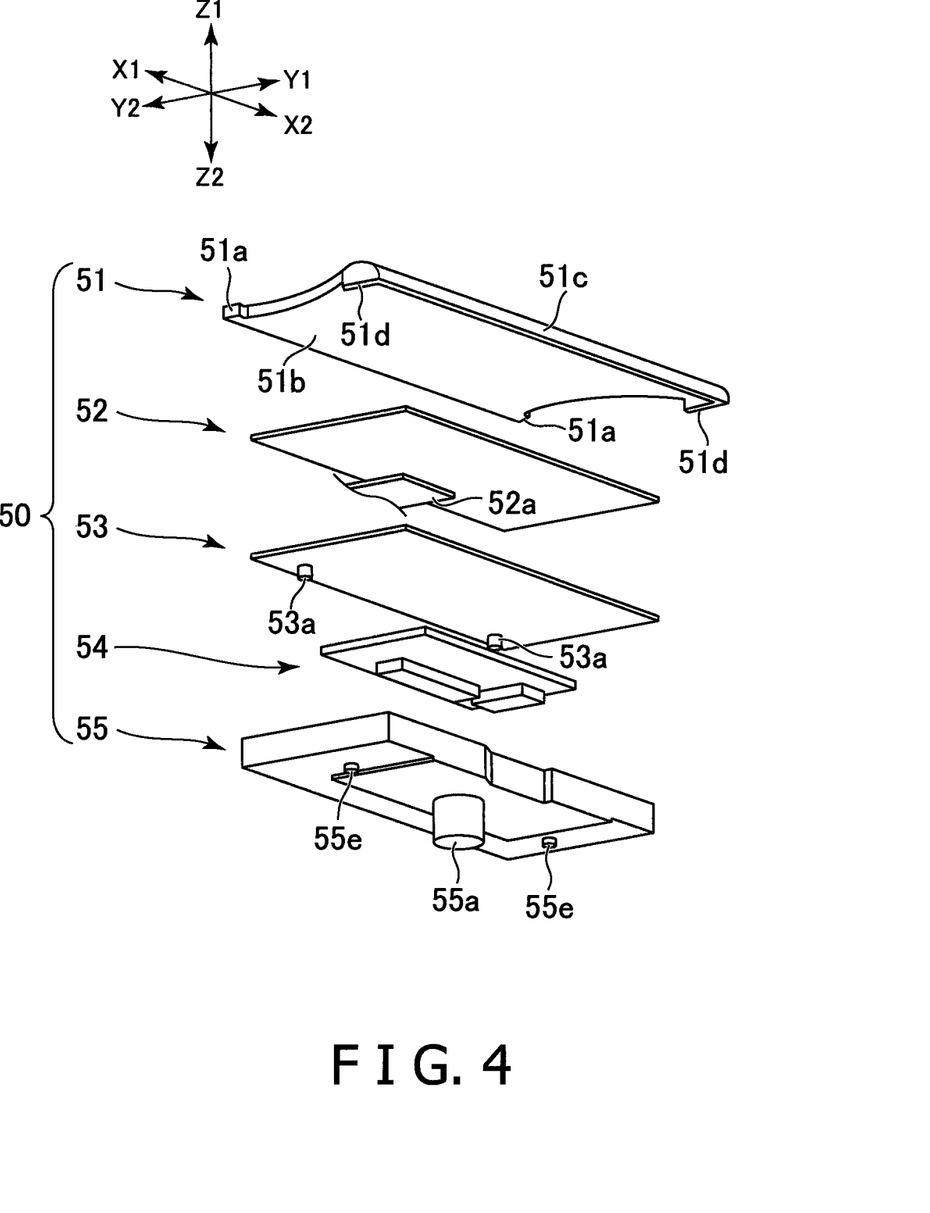
FIG. 4 is an exploded perspective view of an operation panel.
Figure 5:
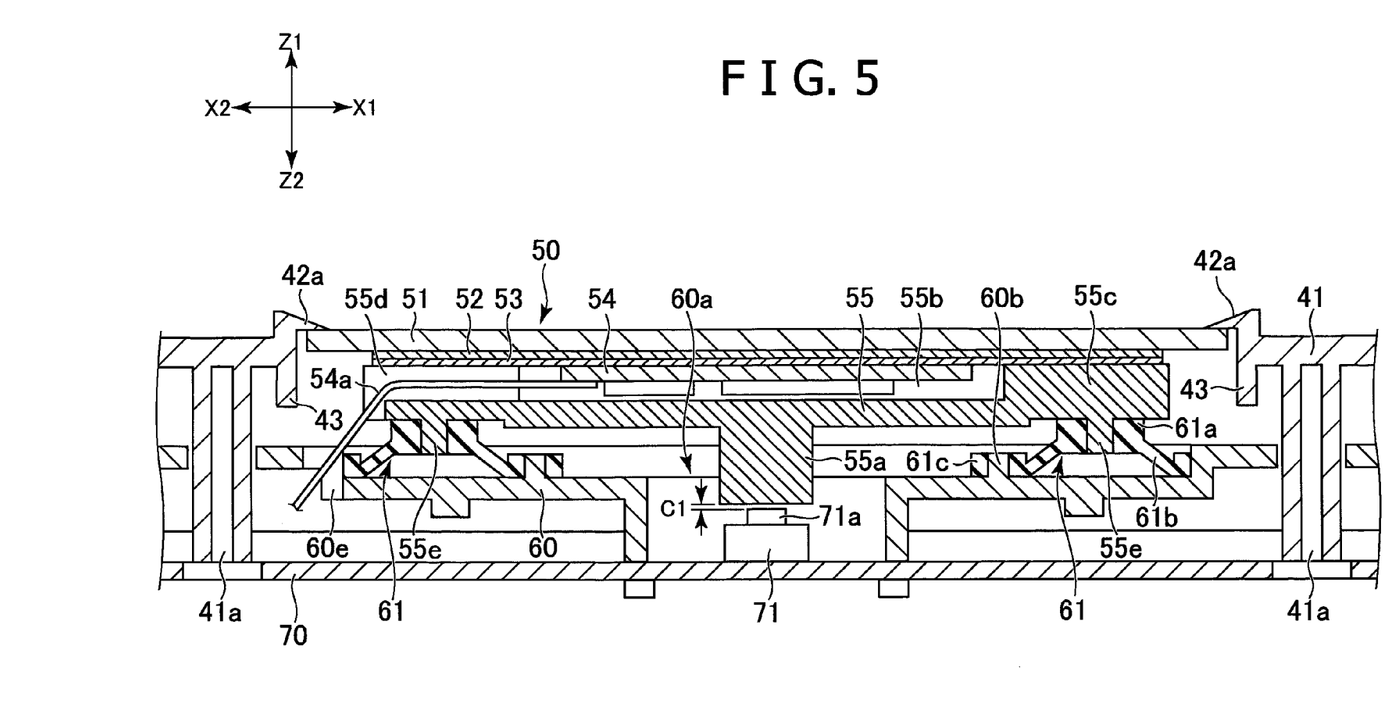
FIG. 5 is a cross-sectional view along line V-V shown in FIG. 2.
Figure 6:
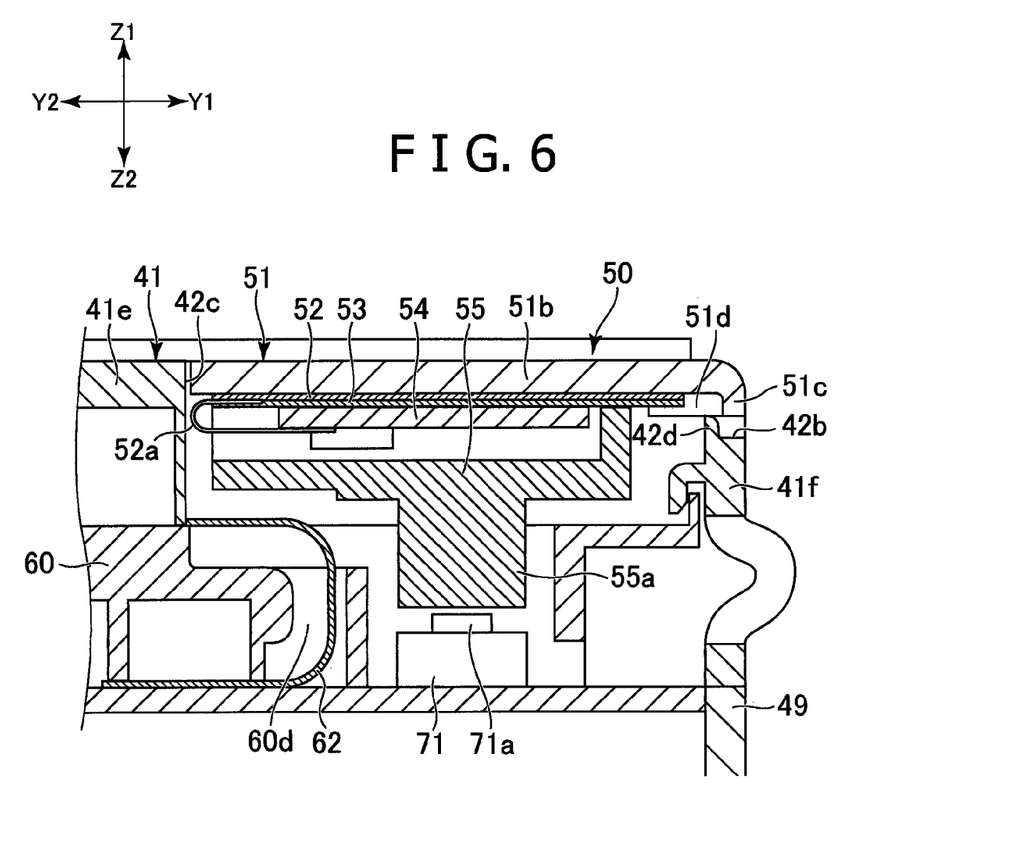
FIG. 6 is a cross-sectional view along line VI-VI shown in FIG. 2.
Figure 7:
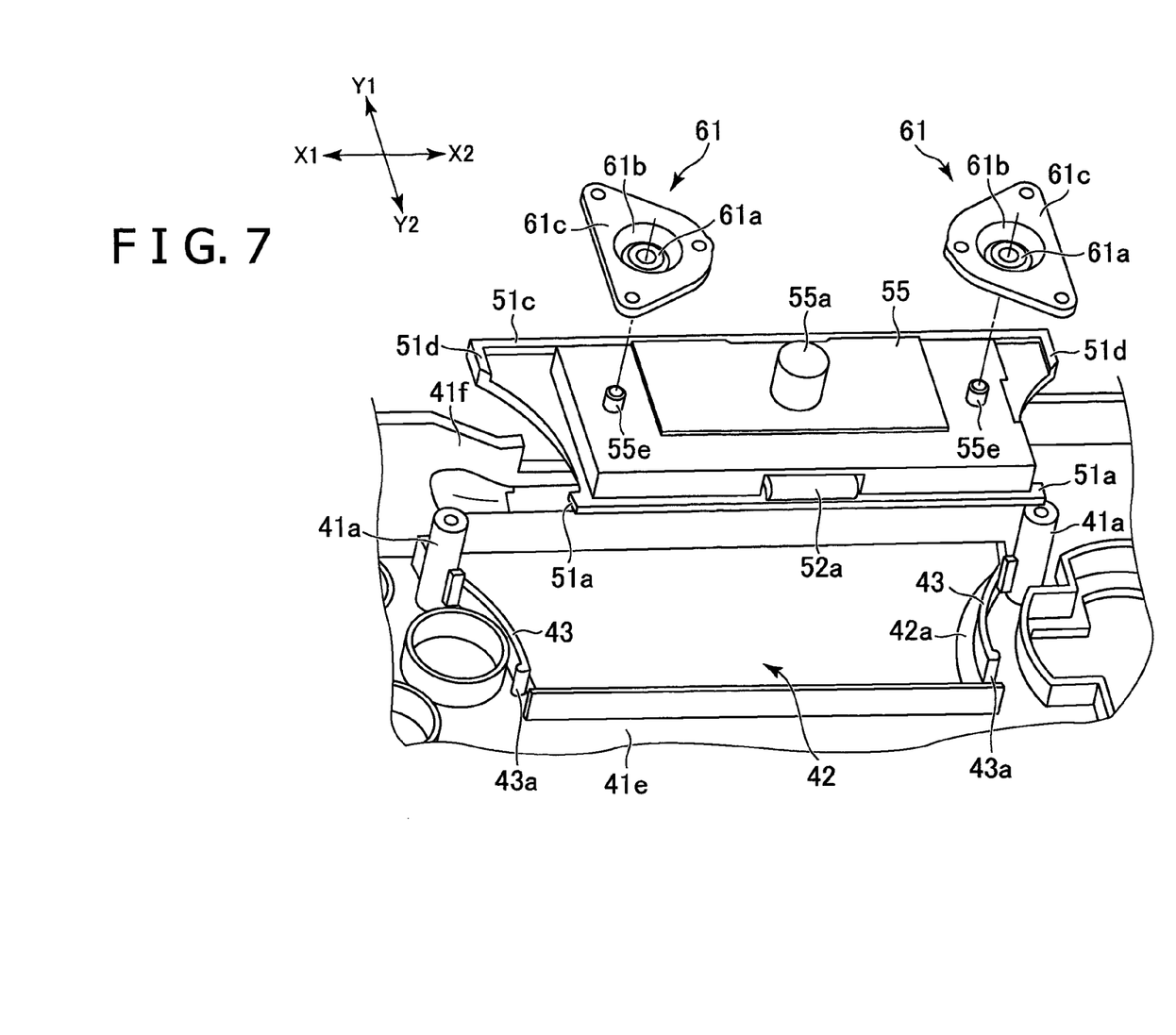
FIG. 7 is an exploded perspective view illustrating the bottom side of an upper housing and that of the operation panel.

A description will be given below of an embodiment of the present disclosure with reference to the accompanying drawings. FIG. 1 is a perspective view of an operating device 1 according to the embodiment of the present disclosure. FIG. 2 is a plan view of the operating device 1. FIG. 3 is an exploded perspective view of the operating device 1. FIG. 3 illustrates an upper housing 41, operation panel 50, frame 60 and circuit board 70. FIG. 4 is an exploded perspective view of the operation panel 50. FIG. 5 is a cross-sectional view along line V-V shown in FIG. 2. FIG. 6 is a cross-sectional view along line VI-VI shown in FIG. 2. FIG. 7 is an exploded perspective view illustrating the bottom side of the upper housing 41 and that of the operation panel 50. In the description given below, Y1 and Y2 shown in FIG. 1 represent forward and backward, respectively. Further, X1 and X2 represent rightward and leftward, respectively. Still further, Z1 and Z2 represent upward and downward, respectively.

The operating device 1 is used as an input device for an information processor having a game program execution function, moving image reproduction function and communication function via the Internet. The operating device 1 is capable of wired or wireless communication with the information processor, transmitting signals responsive to user operations to the information processor. The operating device 1 incorporates a variety of sensors (e.g., acceleration sensor and gyro sensor) used to detect the posture and movement of the operating device 1 and a battery.

As illustrated in FIG. 1, the operating device 1 has, at left and right, left and right held sections 10L and 10R to be held by the user. Front portions of the held sections 10L and 10R are connected by a center portion 21. Operating members adapted to be operated by the user are provided on the top side of the front portion of each of the held sections 10L and 10R. A plurality of operating buttons 11 are provided on the top side of the front portion of the right held section 10R. The operating device 1 has the four operating buttons 11 each of which is located at one end of a cross. A cross-shaped direction key 19 is provided on the top side of the front portion of the left held section 10L. Each of the left and right held sections 10L and 10R has a grip 12. Each of the grips 12 extends from front to back of the held section 10L or 10R.

The operating device 1 has left and right operating sticks 31 on the back of the center portion 21. As illustrated in FIG. 1, each of the operating sticks 31 extends upward from the center portion 21 and has, at its upper end, a circular operated section 31b adapted to be touched by a user's finger. Each of the operating sticks 31 can be tilted radially and rotated while being tilted, for example. The operating device 1 detects the direction of tilt of the stick 31 and the extent of tilt thereof, transmitting signals responsive thereto to the information processor. Further, each of the operating sticks 31 can be slid radially. In this case, the operating device 1 detects the travels of the operating stick 31 in two predetermined directions orthogonal to each other (e.g., longitudinal travel and lateral travel), transmitting signals responsive thereto to the information processor.

As illustrated in FIG. 1, the operating device 1 has the operation panel 50, a plate-shaped operating member. The operation panel 50 includes a surface touched by a user's finger and a touch sensor 52 adapted to detect the position of the user's finger that has touched the surface (refer to FIG. 4). The operation panel 50 is arranged on the top side of the center portion 21 and located between the operating members (operating buttons 11 and direction key 19) provided on the held sections 10R and 10L. Further, the operation panel 50 in this example is arranged to the front of the left and right operating sticks 31.

When holding the held sections 10R and 10L as illustrated in FIG. 2, the user can touch the surface of the operation panel 50 by extending his or her fingers, each on one of the operating buttons 11 or the direction key 19. The user, for example, slides his or her finger in an arbitrary direction on the operation panel 50. The operating device 1 continuously detects the position of the finger on the operation panel 50 with the touch sensor 52, transmitting a signal indicating the detected position to the information processor. The information processor calculates the position of the user's finger and the sliding direction and speed of the finger based on the signal. It should be noted that these calculations may be handled by the operating device 1. Further, the operation panel 50 in this example is supported in such a manner as to be able to move up and down to permit pressing by the user. That is, the operation panel 50 serves also as a plate-shaped push button. The operating device 1 detects the pressing by the user, transmitting a signal indicating the operation to the information processor. The position of the operation panel 50 pressed by the user can be detected based on the signal indicating the position of the user's finger and that indicating the pressing. The structure adapted to support the operation panel 50 will be described in detail later.

The operating device 1 has a housing 40 as illustrated in FIG. 1. The housing 40 not only makes up the outer side of the operating device 1 but also accommodates a variety of components of the operating device 1. The housing 40 in this example has the upper housing 41 and a lower housing 49 that are assembled vertically together.

As illustrated in FIG. 3, the operating device 1 has the circuit board 70. Electronic components are contained on the circuit board 70. These components include a controller adapted to control the operating device 1 as a whole, a communication module adapted to control communication with the information processor, and connectors. These electronic components are not shown in FIG. 3.

The operating device 1 has the plate-shaped frame 60 that is arranged on top of the circuit board 70. The lateral width of the frame 60 in this example is tailored to the circuit board 70, roughly covering the entire area of the circuit board 70. The circuit board 70, frame 60 and upper housing 41 are fastened to each other. For example, the circuit board 70 and upper housing 41 are fastened to each other with the frame 60 sandwiched therebetween with fasteners such as screws. Alternatively, each of the upper housing 41 and circuit board 70 may be fastened to the frame 60 with fasteners such as screws. In FIG. 4, holes of the circuit board 70 and frame 60 into which fasteners are inserted are not shown. As illustrated in FIGS. 5 and 7, a plurality of bosses 41a extending downward are formed on the upper housing 41 in this example. The lower housing 49 is attached to these bosses 41a.

As described above, the operating device 1 has the operating sticks 31. A support structure adapted to support one of the operating sticks 31 is provided at a base portion of the operating stick 31. The support structure supports the operating stick 31, for example, in such a manner as to permit tilting in an arbitrary direction. Alternatively, the support structure may slidably support the operating stick 31. This support structure is arranged on the circuit board 70. The frame 60 has concave portions 60c at its rear edge to avoid the support structures (refer to FIG. 3).

Holes 41b, 41c and 41d are formed in the upper housing 41 as illustrated in FIG. 3. The button 11, operating sticks 31 and direction key 19 are arranged respectively in the holes 41b, 41c and 41d. A film 62 is arranged on top of the frame 60. Contacts (e.g., membrane switches) and electric wires are formed on the film 62 to detect operations of the buttons 11 and direction key 19. The buttons 11 and direction key 19 are electrically connected to the circuit board 70 via the contacts and electric wires on the film 62. A hole 60d vertically penetrating the frame 60 is formed in the frame 60 as illustrated in FIGS. 3 and 6. The film 62 extends through the hole 60d to the bottom side of the frame 60, i.e., toward the circuit board 70.

Thanks to the arrangement of the frame 60 on top of the circuit board 70, a space is available for the support structures of the operating sticks 31 between the upper housing 41 and circuit board 70. At the same time, contacts (i.e., film 62) are arranged in proximity thereto to detect operations of the buttons 11 and direction key 19. Electronic components requiring soldering for mounting are not provided on the film 62. This makes it possible to use a relatively inexpensive material as the film 62.

As illustrated in FIG. 5, the operation panel 50 is arranged on top of the frame 60. The operation panel 50 is supported in such a manner as to be able to move up and down as described earlier. Elastic members 61 adapted to bias the operation panel 50 upward are arranged between the frame 60 and operation panel 50. The elastic members 61 produce counterforces when the user presses the operation panel 50. As illustrated in FIG. 3, the elastic members 61 are attached to the frame 60. In this example, the plurality of (two in this example) elastic members 61 are attached to the frame 60. Each of the elastic members 61 is formed with rubber. The arrangement of the frame 60 between the circuit board 70 and operation panel 50, and of the elastic members 61 between the frame 60 and operation panel 50, makes it possible to keep to a minimum the reduction in degree of freedom in laying out electronic components on the circuit board 70 and forming wiring on the circuit board 70.

As illustrated in FIG. 3, a concave portion 60f is formed on the top side of the frame 60. The areas of the film 62 where the above-mentioned contacts are formed are arranged on right and left portions of the top side of the frame 60, with the concave portion 60f located between the right and left portions. The elastic members 61 are arranged in the concave portion 60f. This allows the elastic members 61 to be arranged between the frame 60 and operation panel 50 while at the same time reducing the distance between the film 62 and buttons 11 and that between the film 62 and direction key 19.

As illustrated in FIG. 3, a switch 71 (tact switch in this example) is contained on the circuit board 70 to detect the downward movement of the operation panel 50. The switch 71 is attached to the circuit board 70, for example, by soldering. The frame 60 has such a shape as to avoid the position that matches the position of the switch 71. In this example, a hole 60a vertically penetrating the frame 60 is formed at the position of the frame 60 matching that of the switch 71. As illustrated in FIG. 5, the operation panel 50 has, on the bottom side, a pressing section 55a adapted to press the switch 71. The pressing section 55a in this example protrudes downward from the bottom side of the operation panel 50 (bottom side of a frame 55 which will be described later) and is located in the hole 60*a*. When the operation panel 50 is pressed, the pressing section 55*a* passes through the frame 60 to press the switch 71. This structure does not require any wiring between the circuit board 70 and switch 71, thus contributing to reduced cost of the operating device 1. Further, because the switch 71 is not contained on the film 62, an inexpensive material can be used for the film 62.

When the operation panel 50 is at its initial position as illustrated in FIG. 5, that is, when the operation panel 50 is not pressed, a clearance C1 is provided between the pressing section 55*a* and switch 71. More specifically, the switch 71 has, at its topmost area, an upwardly biased movable section 71*a* that moves down when pressed by the pressing section 55*a*. The clearance C1 is provided between the pressing section 55*a* and movable section 71*a*. This structure provides an increased counterforce when the pressing section 55*a* comes into contact with the movable section 71*a* after the user has pressed the operation panel 50. As a result, the user can properly recognize the input to the switch 71.

As illustrated in FIG. 3, a plurality of (two in this example) upwardly protruding stopper sections 63 are formed in the frame 60 so as to be located below the operation panel 50. The stopper sections 63 restrict the downward stroke of the operation panel 50 to a predetermined magnitude. This ensures that excessive load is not exerted on the switch 71.

As illustrated in FIG. 5, the two elastic members 61 are arranged on opposite sides with the pressing section 55*a* and hole 60*a* sandwiched therebetween. In this example, the pressing section 55*a* is provided at the center of the operation panel 50. More specifically, the pressing section 55*a* is provided at the lateral and longitudinal center. The two elastic members 61 are arranged, one on the right and another on the left of the pressing section 55*a*, thus biasing right and left portions of the operation panel 50 upward. Each of the elastic members 61 is formed to produce a counterforce, irrespective of which of front and rear portions of the operation panel 50 is pressed.

As illustrated in FIGS. 3 and 5, each of the elastic members 61 in this example has, at its top portion, a contact section 61*a* that comes in contact with the bottom side of the operation panel 50 (bottom side of the frame 55 in this example). Each of the contact sections 61*a* is cylindrical, with its top side in contact with the bottom side of the operation panel 50. Further, each of the elastic members 61 has an annular elastic section 61*b* formed at the lower edge of the contact section 61*a* (refer to FIG. 5). Each of the elastic sections 61*b* extends radially and downward from the lower edge of the contact section 61*a*. Each of the elastic sections 61*b* produces a counterforce when the contact section 61*a* moves down.

Thanks to the above-mentioned shape of the elastic members 61, the contact section 61*a* tilts forward, for example, when a front portion of the operation panel 50 is pressed, allowing a front portion of the elastic section 61*b* to produce a counterforce. On the other hand, when a rear portion of the operation panel 50 is pressed, the contact section 61*a* tilts rearward, allowing a rear portion of the elastic section 61*b* to produce a counterforce. The elastic members 61 are arranged, one on the right and another on the left of the pressing section 55*a*, as described earlier. Therefore, the elastic members 61 allow the pressed portion of the surface of the operation panel 50 to move down irrespective of which position of the surface is pressed while at the same time producing a counterforce in response thereto.

As illustrated in FIGS. 3 and 5, each of the elastic members 61 has an attachment section 61*c* that spreads horizontally from the lower edge of the elastic section 61*b*. The attachment sections 61*c* are attached to the frame 60. In this example, a plurality of (three in this example; refer to FIG. 3) protrusions 60*b* are formed on the frame 60. Holes are formed in each of the attachment sections 61*c*. One of the protrusions 60*b* is fitted into each of these holes.

As illustrated in FIG. 3, an opening 42 is formed in the upper housing 41 to expose the surface of the operation panel 50. The edges of the opening 42 include portions adapted to restrict the upward movement of the operation panel 50. In this example, as illustrated in FIG. 5, right and left edges 42*a* of the opening 42 are formed respectively along the right and left edges of the operation panel 50. In addition, the edges 42*a* hang over the top of the operation panel 50. The edges 42*a* restrict the upward movement of the operation panel 50.

Each of the right and left edges 42*a* serves as a fulcrum when the operation panel 50 is pressed. For example, when the right or left portion of the operation panel 50 is pressed, the operation panel 50 tilts about the edge 42*a* on the opposite side as a fulcrum. When the front portion of the operation panel 50 is pressed, rear portions of the right and left edges 42*a* serve as fulcrums, allowing the operation panel 50 to tilt. Conversely, when the rear portion of the operation panel 50 is pressed, front portions of the right and left edges 42*a* serve as fulcrums, allowing the operation panel 50 to tilt. If the operation panel 50 tilts as described above, the pressing section 55*a* moves down, pressing the switch 71. It should be noted that when part of an outer perimeter portion (e.g., right or left portion) of the operation panel 50 is pressed, the pressing section 55*a* also tilts. The hole 60*a* formed in the frame 60 is sized to permit this tilting of the pressing section 55*a*.

As illustrated in FIG. 4, the operation panel 50 in this example has a top panel 51 that is made of resin and makes up the surface of the operation panel 50. The touch sensor 52 is arranged on the rear side of the top panel 51. The top panel 51 in this example is formed in such a manner as to increase in lateral width as it extends forward. The shape of the top panel 51 is not limited thereto, and the top panel 51 may be, for example, rectangular.

The operation panel 50 in this example has the frame 55 that is arranged on the rear side of the touch sensor 52 and makes up the bottom side of the operation panel 50. The elastic members 61 are in contact with the frame 55. The pressing section 55*a* protrudes downward from the bottom side of the frame 55. Thanks to the frame 55 provided on the operation panel 50, it is possible to prevent the elastic members 61 from coming into contact with the touch sensor 52 and a board 54 which will be described later. This makes it possible to prevent any load from acting thereon. Further, the frame 55 contributes to improved rigidity of the operation panel 50. This makes it possible to prevent bending of the operation panel 50 when the operation panel 50 tilts after part of the outer perimeter portion of the operation panel 50 has been pressed, clearly transferring the pressing of the operation panel 50 to the switch 71.

One of the operation panel 50 and each of the elastic members 61 has protrusions. The other thereof has holes formed thereon into each of which one of the protrusions is fitted. This allows the operation panel 50 to return to its initial position by the elastic forces of the elastic members 61 even in the event of only a slight horizontal movement of the operation panel 50 as a result of the user sliding his or her finger on the operation panel 50. In this example, cylindrical protrusions 55e are formed, one each at left and right, on the bottom side of the frame 55 as illustrated in FIG. 7. A hole is formed in the contact section 61a of each of the elastic members 61 (refer to FIG. 5). This hole is sized to match the size of the protrusion 55e, and the protrusion 55e is fitted into this hole. As described above, each of the elastic sections 61b is formed in an annular shape to surround the contact section 61a. This makes it possible to bring the operation panel 50 back to its initial position by the elastic force of the elastic section 61b irrespective of the direction in which the position of the operation panel 50 is displaced.

As illustrated in FIG. 4, the operation panel 50 in this example has the circuit board 54 and a protective plate 53. A drive circuit of the touch sensor 52 is contained on the circuit board 54. The protective plate 53 is arranged between the touch sensor 52 and circuit board 54. The protective plate 53 is made of an insulating material such as resin, preventing electrical contact between the touch sensor 52 and circuit board 54. The circuit board 54 and touch sensor 52 are connected together with a flat cable 52a attached to the touch sensor 52. As described above, it is possible to prevent upsizing of the circuit board 70 by providing the circuit board 54 in the operation panel 50, thus preventing upsizing of the operating device 1.

As illustrated in FIG. 5, a concave portion 55b is formed in the frame 55 to accommodate the circuit board 54. In other words, the frame 55 has an outer perimeter portion 55c that surrounds the circuit board 54. This shape of the frame 55 provides improved rigidity of the frame 55.

A flat cable 54a connected to the circuit board 70 is attached to the circuit board 54. An opening 55d is formed in the outer perimeter portion 55c of the frame 55. The opening 55d is open to the outside of the frame 55. The flat cable 54a extends externally from the frame 55 through the opening 55d. In this example, the opening 55d is formed on a left-side portion of the outer perimeter portion 55c. Further, a hole 60e is formed in the frame 60. The flat cable 54a extends from the top (side of the operation panel 50) to the bottom (side of the circuit board 70) of the frame 60 through the hole 60e.

The plurality of members making up the operation panel 50 are attached to each other in such a manner as to move in an integral manner. These members are attached, for example, with an adhesive. That is, the touch sensor 52 is bonded to the top panel 51, the protective plate 53 to the touch sensor 52, and the board 54 to the protective plate 53. Further, the outer perimeter portion 55c of the frame 55 is bonded to the protective plate 53. The attachment method of the top panel 51, touch sensor 52, protective plate 53, board 54 and frame 55 is not limited to bonding. For example, the outer perimeter portion 55c of the frame 55 may be attached to the top panel 51 with fasteners such as screws with the touch sensor 52 and protective plate 53 sandwiched between the frame 55 and top panel 51. As illustrated in FIG. 4, the protective plate 53 has a plurality of (two in this example) protrusions 53a on the bottom side. The outer perimeter portion 55c of the frame 55 has holes formed thereon into each of which one of the protrusions 53a is fitted. This makes it possible to effectively prevent the displacement of the frame 55 relative to the protective plate 53. It should be noted that these protrusions 53a need not necessarily be formed.

As described above, the opening 42 is formed in the upper housing 41 to expose the surface of the operation panel 50. As illustrated in FIG. 3, a rear edge 42c of the opening 42 is located on the rear of the operation panel 50 and runs along the rear edge of the operation panel 50. On the other hand, a front edge 42b of the opening 42 is located below the frontmost portion of the operation panel 50 (refer to FIG. 6). That is, the edge of the opening 42 does not include any portion located on the front of the operation panel 50. This makes it possible for the user to move his or her finger forward smoothly on the operation panel 50. Further, the user can smoothly press the frontmost portion of the operation panel 50. The upper housing 41 has a top side section 41e and front side section 41f. The top side section 41e makes up the top side of the operating device 1. The front side section 41f makes up the front side of the operating device 1. The rear edge 42c and the right and left edges 42a of the opening 42 are formed on the top side section 41e, and the front edge 42b is formed on the front side section 41f.

Stopper sections 43 are formed on the upper housing 41 to restrict the forward movement of the operation panel 50. In this example, the upper housing 41 has the two stopper sections 43 on the bottom side of the top side section 41e. The stopper sections 43 in this example are located, one on the left and another on the right of the opening 42, and formed in the shape of walls running respectively along the left and right edges of the operation panel 50 (left and right edges of the top panel 51 in this example). The top panel 51 has stopped sections 51a, one at its right edge and another at its left edge. Each of the stopped sections 51a in this example protrudes laterally outward from the rear end of the left or right edge of the top panel 51 and is located on the rear of a rear end 43a of the stopper section 43. As the operation panel 50 attempts to move forward, each of the stopped sections 51a comes into contact with the rear end 43a of the stopper section 43, thus restricting the forward movement of the operation panel 50.

As described above, the stopper sections 43 are formed on the upper housing 41 making up the outer sides of the operating device 1. This provides a reduced tolerance of the position of the operation panel 50 relative to the upper housing 41, thus contributing to improved appearance of the operating device 1. Further, in this example, the stopped sections 51a are formed on the top panel 51 making up the outer side of the operating device 1. This provides a reduced tolerance of the position of the top panel 51 relative to the upper housing 41, thus contributing to further improved appearance of the operating device 1. Still further, the structure in which the stopped sections 51a are formed, one at the right edge and another at the left edge of the top panel 51, provides a smaller contact area between the stopped sections 51a and upper housing 41 than the structure in which the lower edge of a front side section 51c (refer to FIG. 4), which is provided, for example, on the frontmost portion of the top panel 51 and will be described later, serves as a stopped section. This contributes to reduced resistance felt by the user when he or she presses the operation panel 50.

As described above, the stopper sections 43 are formed in the shape of walls running along the left and right edges of the top panel 51. That is, the top panel 51 is arranged between the left and right stopper sections 43. Therefore, the stopper sections 43 also restrict the lateral movement of the operation panel 50.

As described above, the upper housing 41 has no edges located on the front of the front edge of the top panel 51. Therefore, the front edge of the top panel 51 makes up the front edge of the top side of the center portion 21 of the operating device 1. The top panel 51 in the example shown here has a top side section 51b to which the touch sensor 52 is attached as illustrated in FIG. 6. The touch sensor 52 detects the position of the user's finger on the surface of the top side section 51b. The front edge of the top side section 51b makes up the front edge of the center portion 21. The top panel 51 further includes the front side section 51c. The front side section 51c extends from the front of the top side section 51b (more specifically, the front edge of the top side section 51b), making up the front side of the operating device 1. The front side section 51c and top side section 51b in this example have an approximately L-shaped cross section. The front side section 51c provided on the top panel 51 contributes to improved rigidity of the top panel 51. This makes it possible to prevent bending of the operation panel 50 when the outer perimeter portion of the operation panel 50 is pressed, clearly transferring the pressing of the operation panel 50 to the switch 71.

As illustrated in FIG. 6, the front edge 42b of the opening 42 formed on the upper housing 41 is located below the front side section 51c of the top panel 51. A clearance is provided between the front edge 42b and the lower edge of the front side section 51c to permit the downward movement of the operation panel 50. A shielding section 42d is formed on the front edge 42b. The shielding section 42d protrudes upward and is located more inward than the front side section 51c. The shielding section 42d prevents the inside of the operating device 1 from being visible through the clearance.

The top panel 51 has lateral side sections 51d, each hanging down from the left or right edge thereof, as illustrated in FIG. 4. The lateral side sections 51d in this example each hang down from the frontmost portion of the left or right edge. This contributes to further improved rigidity of the top panel 51. It should be noted that the lateral side sections 51d may hang down from the entire left and right edges of the top panel 51.

As explained earlier, the operating device 1 has the frame 60 located on top of the circuit board 70 and the operation panel 50 located on top of the frame 60. The operation panel 50 includes a surface touched by a user's finger and a touch sensor adapted to detect the position of the user's finger that has touched the surface. The operation panel 50 is arranged to be able to move up and down so that it can be pressed by the user. Further, the elastic members 61 are arranged between the frame 60 and operation panel 50 to bias the operation panel 50 upward. This structure allows the user to slide his or her finger on the operation panel 50 and press the operation panel 50 while at the same time sliding his or her finger thereon, thus diversifying operation methods. Further, there is no need to provide any area for attaching the elastic members 61 on the circuit board 70, thus keeping to a minimum the reduction in the degree of freedom in laying out components and wiring on the circuit board 70.

Further, the switch 71 is contained on the circuit board 70 to detect the downward movement of the operation panel 50. The frame 60 has such a shape as to avoid the position that matches the position of the switch 71. The operation panel 50 has, on the bottom side, the pressing section 55a adapted to press the switch 71. This structure eliminates the need for a cable to connect the switch 71 and circuit board 70, thus contributing to reduced cost of the operating device 1.

Further, the operation panel 50 is arranged in such a manner that the pressed portion of the surface thereof moves down irrespective of which portion thereof is pressed. This structure contributes to improved operability of the operation panel 50.

The operation panel 50 has the frame 55 that has the pressing section 55a formed on the bottom side thereof. This structure contributes to improved rigidity of the operation panel 50, clearly transferring the pressing of the operation panel 50 to the switch 71.

One of the operation panel 50 and each of the elastic members 61 has protrusions. The other thereof has holes formed thereon into each of which one of the protrusions is fitted. This structure allows the operation panel 50 to return to its initial position by the elastic forces of the elastic members 61 even in the event of only a slight horizontal movement of the operation panel 50.

The operating device disclosed in U.S. Pat. No. 6,394,906 has operating members such as buttons and operating sticks. The user can move objects displayed on a display device connected to an information processor and select menus from a menu list by operating the operating members. Among operations that can be performed on the operating device in related art by the user are pressing the buttons, tilting the operating stick, and rotating the operating stick while keeping it tilted. Diversification of user operation provides improved operability of the operating device. The operating device 1 has a plate-shaped operating member (i.e., operation panel 50) that is arranged on the top side of the operating device 1 and supported to be able to move up and down so that it can be pressed by the user. The operating member includes the surface touched by a user's finger and the touch sensor 52 adapted to detect the position of the user's finger that has touched the surface. Further, the operating device 1 includes the housing 40. The opening 42 is formed in the housing 40 to expose the surface of the operation panel 50. The front edge 42b of the opening 42 is formed below the operation panel 50. The stopper sections 43 are formed on the housing 40 to restrict the forward movement of the operation panel 50. This structure makes it possible for the user to move his or her finger forward smoothly on the operation panel 50. Further, the user can smoothly press the frontmost portion of the operation panel 50.

The operation panel 50 has the top panel 51 that makes up the surface touched by the user's finger, and the stopped sections 51a which come into contact with the stopper sections 43 are formed in the top panel 51. This structure provides a reduced tolerance of the position of the top panel 51 relative to the upper housing 41, thus contributing to improved appearance of the operating device 1.

Further, the operation panel 50 has the top panel 51 that makes up the surface touched by the user's finger, and the top panel 51 includes the top side section 51b and front side section 51c. The touch sensor 52 is attached to the top side section 51b. The front side section 51c extends from the front of the top side section 51b to make up the front side of the operating device 1. This structure contributes to improved rigidity of the operation panel 50.

Further, the operation panel 50 has the stopped sections 51a, one on the left and another on the right. The upper housing 41 has the two stopper sections 43 adapted to restrict the forward movements of the left and right stopped sections 51a, respectively. This structure provides a smaller contact area between the stopped sections 51a and upper housing 41 than the structure in which the lower edge of the front side section 51c of the top panel 51 serves as a stopped section. This contributes to reduced resistance felt by the user when he or she presses the operation panel 50.

It should be noted that the present disclosure can be modified in various ways, and that modifications are not limited to the operating device 1 described above.

Figure 8:
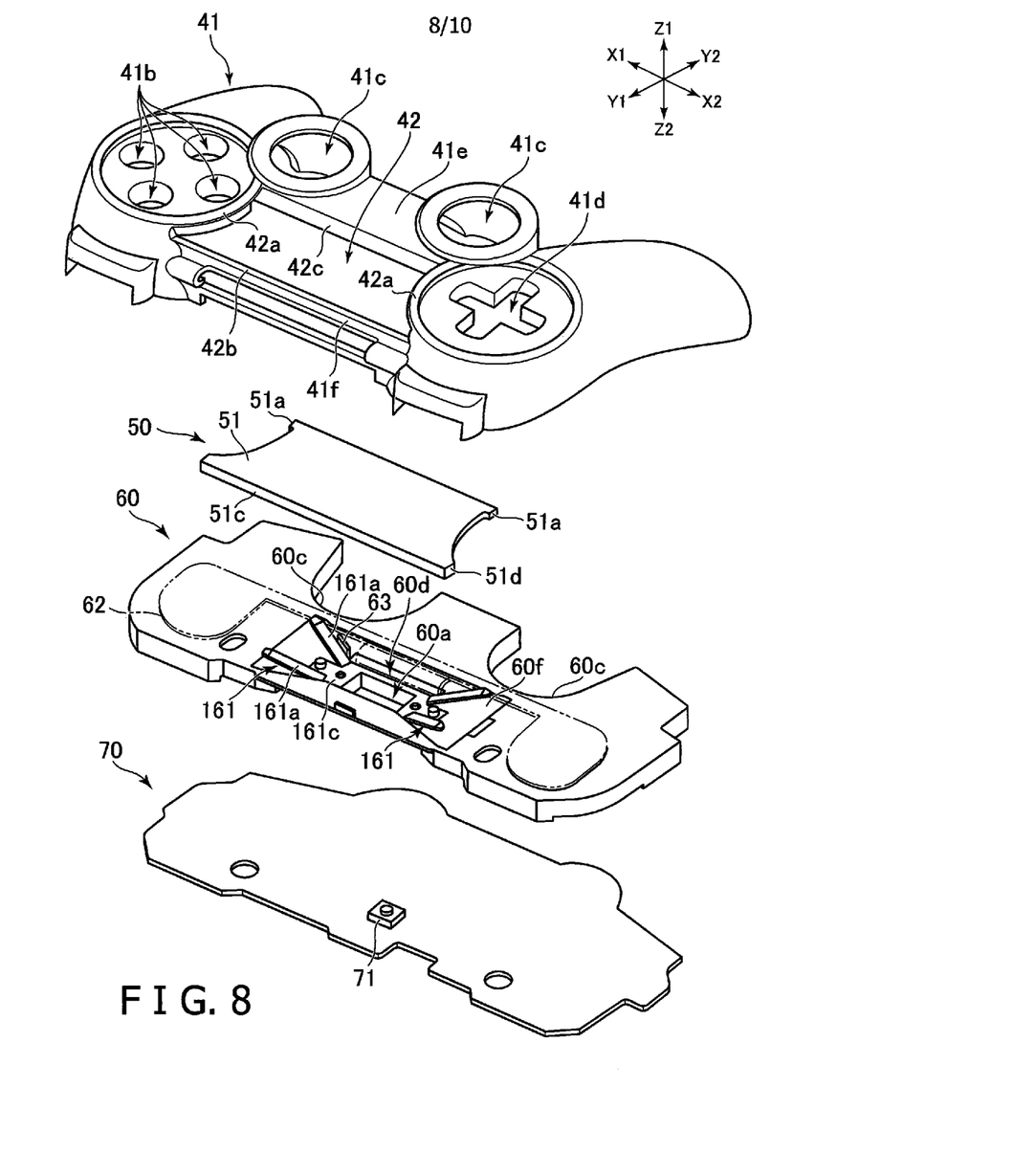
FIG. 8 is an exploded perspective view illustrating an example in which each of elastic members is formed with a spring.
Figure 9:
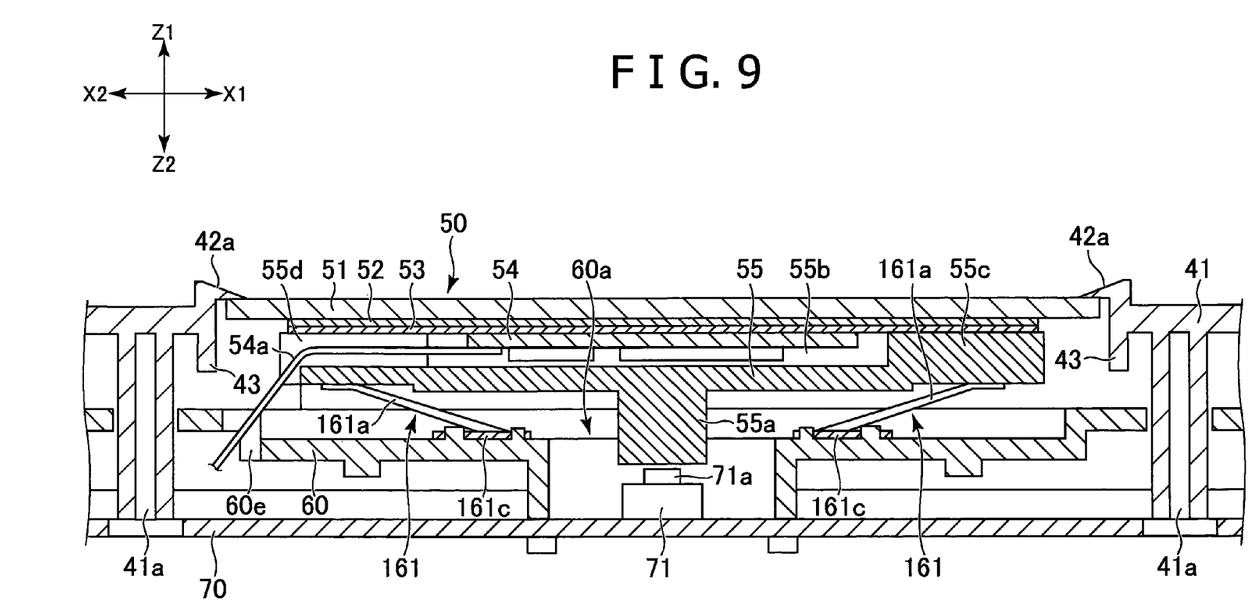
FIG. 9 is a cross-sectional view illustrating the example in which each of the elastic members is formed with a spring.

For example, although the elastic members 61 are formed with rubber, they may be formed with springs. FIGS. 8 and 9 illustrate an example in which the elastic members are formed with springs. FIG. 8 is an exploded perspective view, and FIG. 9 is a cross-sectional view obtained from the same cutting plane as in FIG. 5. In these figures, the same components are denoted by the same reference symbols. In the description given below, the differences from the example shown in FIGS. 1 to 7 will be described, and this example is identical in all other respects to the example shown in FIGS. 1 to 7.

In the example shown in FIG. 8, elastic members 161 adapted to bias the operation panel 50 upward are attached to the frame 60. The elastic members 161 in this example are plate springs. The elastic members 161 bias upward the bottom side of the operation panel 50 (more specifically, the bottom side of the frame 55) at four points. The four points are spaced apart longitudinally and laterally from each other. More specifically, the two elastic members 161 located, one on the left and another on the right of the hole 60a, are attached to the frame 60. Each of the elastic members 161 has an attachment section 161c and two plate sections 161a. The attachment section 161c is attached to the frame 60. The end of each of the plate sections 161a is in contact with the bottom side of the frame 55 to push the frame 55 upward. The two plate sections 161a in this example extend laterally outward from the attachment section 161c. That is, the two plate sections 161a extend away from the hole 60a formed in the frame 60. Further, the two plate sections 161a tilt respectively forward and rearward. As a result, the ends of the two plate sections 161a are located longitudinally apart from each other, with the two elastic members 161 pushing the four corners of the frame 55 upward.

Figure 10A:
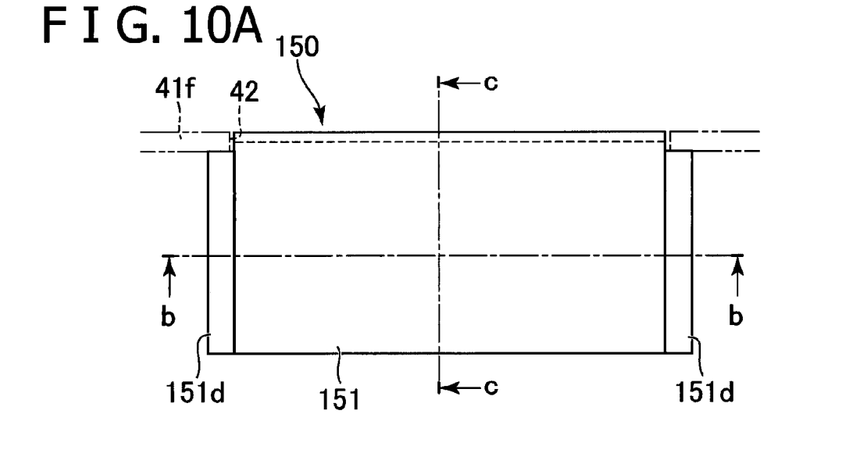
FIGS. 10A to 10C are views illustrating modification examples of the operation panel.
Figure 10B:
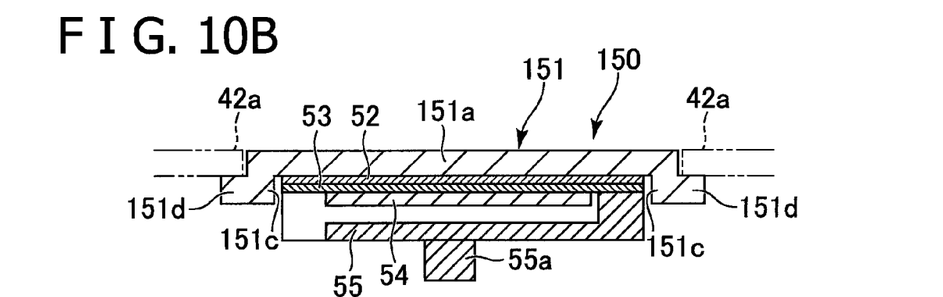
Figure 10C:
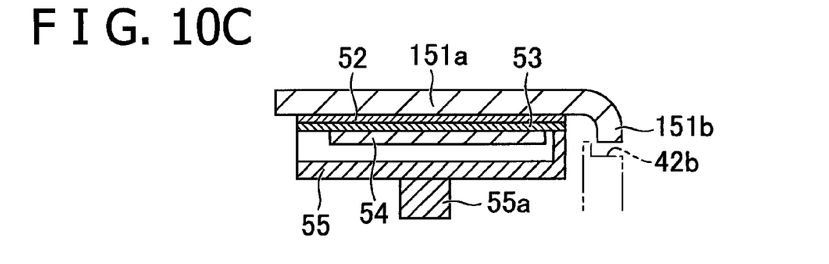

In the description given above, the operation panel 50 was formed in such a manner as to increase in lateral width as it extends forward. However, the operation panel 50 may be rectangular in plan view. FIGS. 10A to 10C illustrate an operation panel 150, an example of such an operation panel. FIG. 10A is a plan view of the operation panel 150. FIG. 10B is a cross-sectional view along line b-b shown in FIG. 10A. FIG. 10C is a cross-sectional view along line c-c shown in FIG. 10A.

As illustrated in FIG. 10C, the operation panel 150 has a top panel 151 that makes up the surface of the operation panel 150. The top panel 151 has a top side section 151a and front side section 151b. The touch sensor 52 is attached to the top side section 151a. The front side section 151b hangs down from the front of the top side section 151a. The front side section 151b makes up the front side of the operating device 1 as does the front side section 51c of the operation panel 50. That is, the front edge 42b of the opening 42 of the upper housing 41 is located below the front side section 151b in this example as well. Further, the top panel 151 has lateral side sections 151c, each hanging down from the left or right edge of the top side section 151a. As described above, the front side section 151b and the left and right lateral side sections 151c formed on the top panel 151 contribute to improved rigidity of the top panel 151.

As illustrated in FIG. 10B, the top panel 151 has flange sections 151d, one at its left edge and another at its right edge. More specifically, each of the flange sections 151d projects laterally outward from the lower edge of one of the lateral side sections 151c. Each of the flange sections 151d is located below the left or right edge 42a of the opening 42 formed in the upper housing 41. This restricts the upward movement of the operation panel 150.

As illustrated in FIG. 10A, the edges of the opening 42 include portions located on the front of the flange sections 151d. These portions serve as stopper sections adapted to restrict the forward movement of the operation panel 150, and the front edges of the flange sections 151d serve as stopped sections.

In the description given above, the operating device 1 has the two elastic members 61 formed with rubber or the two elastic members 161 formed with plate springs. The two elastic members 61 may be connected together. Similarly, the two elastic members 161 may be connected together.

Further, the pressing section 55a adapted to press the switch 71 is formed on the frame 55. However, the frame 55 need not necessarily be provided on the operation panel 50. In this case, the pressing section 55a may be formed on the protective plate 53, with a hole provided at a position of the substrate 54 matching the position of the pressing section 55a.

Further, the operation panel 50 may not include the board 54. In this case, the operation panel 50 may include no protective plate 53 or frame 55. Further, in this case, the pressing section 55a may be formed on the top panel 51.

The present technology contains subject matter related to that disclosed in Japanese Priority Patent Application JP2012-228482 filed in the Japan Patent Office on Oct. 15, 2012, the entire content of which is hereby incorporated by reference.

What is claimed is:

1. An operating device comprising:
   a circuit board;
   a frame coupled to the circuit board and maintaining the circuit board in a fixed position;
   a plate-shaped operating member accessible by a user through the frame, the plate-shaped operating member including a surface and a touch sensor adapted to detect a position of the user's finger that touches the surface, the plate-shaped operating member being arranged to be able to move towards and away from the circuit board in response to pressing and releasing forces on the operating member by the user;
   a switch mounted to the circuit board and fixed in relation to the frame, the switch being located in such a way as to detect the movement of the plate-shaped operating member towards and away from the circuit board; and
   an elastic member fixedly mounted to the frame and arranged between the frame and the operating member in such a way as to bias the operating member away from the circuit board.

2. The operating device of claim 1, wherein
   the frame has such a shape as to avoid a position that matches the position of the switch, and
   the operating member has, on a bottom side, a pressing section adapted to press the switch.

3. The operating device of claim 2, wherein the operating member has a frame that has the pressing section formed on the bottom side.

4. The operating device of claim 1, wherein the operating member is arranged in such a manner that a pressed portion of the surface of the operating member moves down irrespective of which portion of the surface is pressed.

5. The operating device of claim 1, wherein one of the operating member and the elastic member has a protrusion, and the other has a hole into which the protrusion is fitted.

6. The operating device of claim 1, further comprising a housing having an opening formed to expose the surface of the operating member, a front edge of the opening formed below the operating member, and a stopper section formed to restrict a forward movement of the operating member.

7. The operating device of claim 6, wherein the operating member has a top panel that makes up the surface touched by a user's finger, and a stopped section with which the stopper section comes into contact is formed on the top panel.

8. The operating device of claim 6, wherein the operating member has a top panel that makes up the surface touched by a user's finger, and the top panel includes a top side section to which the touch sensor is attached and a front side section that extends from the front of the top side section and makes up a front side of the operating device.

9. The operating device of claim 6, wherein the operating member has stopped sections, one on the left and another on the right, and the housing has, as the stopper section, two stopper sections adapted to restrict forward movements of the left and right stopped sections, respectively.

\* \* \* \* \*